(12) United States Patent
Ryu (10) Patent No.: US 7,613,084 B2
(45) Date of Patent: Nov. 3, 2009

(54) METHOD FOR SEEKING TARGET POSITION ON MULTI-LAYER DISC

(75) Inventor: Young Soo Ryu, Osani si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 582 days.

(21) Appl. No.: 11/326,401

(22) Filed: Jan. 6, 2006

(65) Prior Publication Data

US 2006/0176784 A1 Aug. 10, 2006

(30) Foreign Application Priority Data

Jan. 6, 2005 (KR) .................... 10-2005-0001119

(51) Int. Cl.
*G11B 7/00* (2006.01)
(52) U.S. Cl. .................................. 369/44.35
(58) Field of Classification Search ............ None
See application file for complete search history.

(56) References Cited

U.S. PATENT DOCUMENTS

| | | | | |
|---|---|---|---|---|
| 5,881,032 A | * | 3/1999 | Ito et al. | 369/30.1 |
| 5,978,328 A | * | 11/1999 | Tanaka | 369/44.27 |
| 6,317,403 B1 | * | 11/2001 | Ono et al. | 369/94 |
| 6,330,212 B1 | | 12/2001 | Iida | |
| 2002/0054548 A1 | * | 5/2002 | Tateishi | 369/44.27 |
| 2002/0093890 A1 | | 7/2002 | Iida | |
| 2003/0081535 A1 | | 5/2003 | Ross | |
| 2003/0137910 A1 | * | 7/2003 | Ueda et al. | 369/47.14 |
| 2004/0076084 A1 | | 4/2004 | Yonezawa | |
| 2005/0207304 A1 | * | 9/2005 | Murotani | 369/53.23 |

FOREIGN PATENT DOCUMENTS

WO    WO 97/15050    4/1997

OTHER PUBLICATIONS

EP Search Report dated Dec. 6, 2006.
Chinese Office Action dated Jun. 8, 2007.

* cited by examiner

*Primary Examiner*—Peter Vincent Agustin
(74) *Attorney, Agent, or Firm*—KED & Associates, LLP

(57) ABSTRACT

A method for seeking a target position on a multi-layer disc is provided. When a target position seek operation requires a layer jump in an optical disc, a required horizontal movement direction for the optical pick-up is determined. If the optical pickup must move horizontally from the outer circumference to the inner circumference of the disc, the horizontal movement operation is performed first at the current layer, and then a layer jump operation is performed. Because the layer jump operation is performed at the inner circumference of the optical disc, where the optical pickup will not likely encounter a data area which includes location information, a target position seek operation which requires a jump between multiple layers of the disc can be precisely and rapidly performed.

13 Claims, 7 Drawing Sheets

DVD+R_Dual Layer

FIG. 5
Related Art (a) finalized with 1 session

| Lead-out Area | User Data(Session #1) | Middle Area | Layer 1 |

| Lead-in Area | User Data(Session #1) | Middle Area | Layer 0 |

(b) finalized with multi sessions

| Lead-out Area | User Data (Session #3) | Intro | Closure | User Data (S #2) | Middle Area | Layer 1 |

| Lead-in Area | User Data (Session #1) | Closure | Intro | User Data (Session #2) | Middle Area | Layer 0 |

METHOD FOR SEEKING TARGET POSITION ON MULTI-LAYER DISC

BACKGROUND OF THE INVENTION

1. Field of the Invention

The present invention relates to a recording disc, and, more particularly, to a method for seeking a target position on a multi-layer disc.

2. Background of the Related Art

Optical discs such as digital versatile discs (DVDs) have become commonly used. Such discs are capable of recording and reproducing high duration, high quality video data and audio data. These optical discs can be a reproduction-dedicated DVD-ROM, once recordable DVD-R and DVD+R, and recordable DVD-RW, DVD+RW, DVD-RAM, or the equivalent. Blue-ray discs have a relatively higher recording density than the optical discs. An optical disc or a blue-ray disc may be multi-layer discs having a first recording layer, Layer 0, a second recording layer, Layer 1, and are often used to increase the amount of recordable data that may be recorded on an optical disc.

Figure 1:
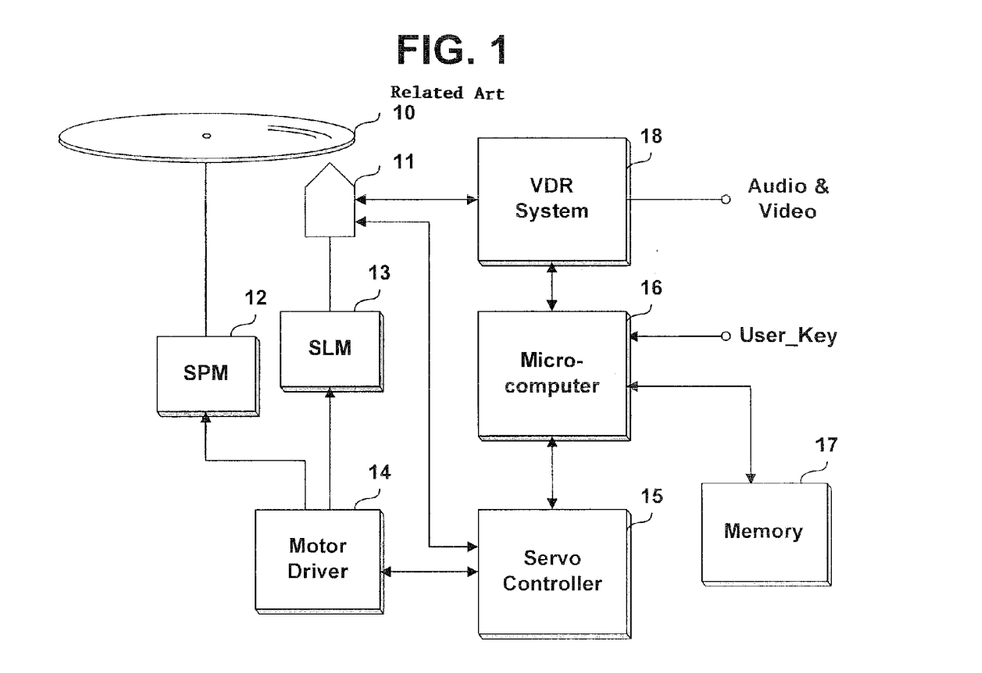
FIG. 1 is a schematic block diagram of a general DVD recorder.

A disc device, such as, for example, a DVD-Recorder, is capable of recording or reproducing data on the optical disc or blue-ray disc. As shown in FIG. 1, the DVD-recorder includes an optical disc 10, an optical pick-up 11, a spindle motor 12, a sled motor 13, a motor driving unit 14, a servo controller 15, a micro-computer 16, a memory 17 and a video disc record (VDR) system 18. The microcomputer 16 controls operations of the VDR system 18 such that data recorded on the optical disc 10 can be reproduced from the optical disc 10 or data from the outside can be recorded on the optical disc 10.

Figure 2:
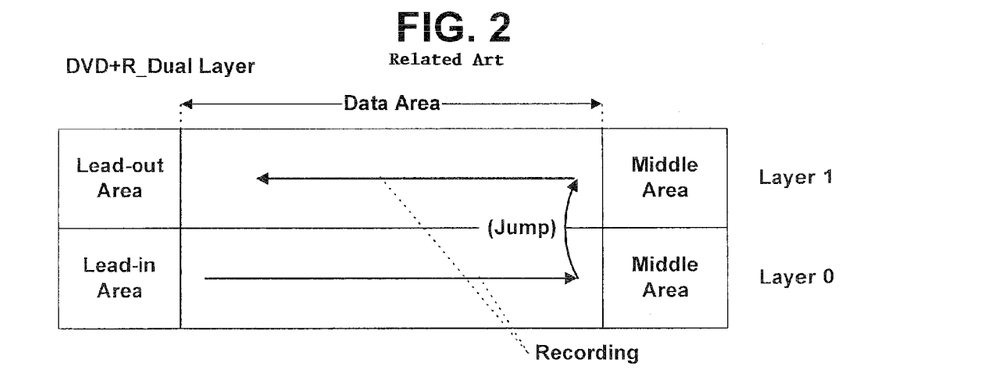
FIG. 2 illustrates a process for recording data on a multi-layer disc.

As shown in Fig. 2 when a multi-layer disc 10, such as a DVD+R dual layer, is inserted in the optical disc device and a data recording operation is performed, the VDR system 18 operates such that data is recorded on a first recording layer, Layer 0 of the multi-layer disc 10 from an inner circumference to an outer circumference of the disc 10.

When all of the data area allocated in the first recording layer, Layer 0, which is between the inner circumference of the disc 10 and a middle area formed between layers proximate the outer circumference of the disc 10, is filled, the micro-computer 16 controls operations of the servo controller 15 such that the optical pick-up 11 can perform a layer jump to access the second recording layer, Layer 1. After that, the VDR system 18 operates such that data can be recorded in the second recording layer, Layer 1 of the disc 10 from the outer circumference to the inner circumference of the disc 10.

Figure 3:
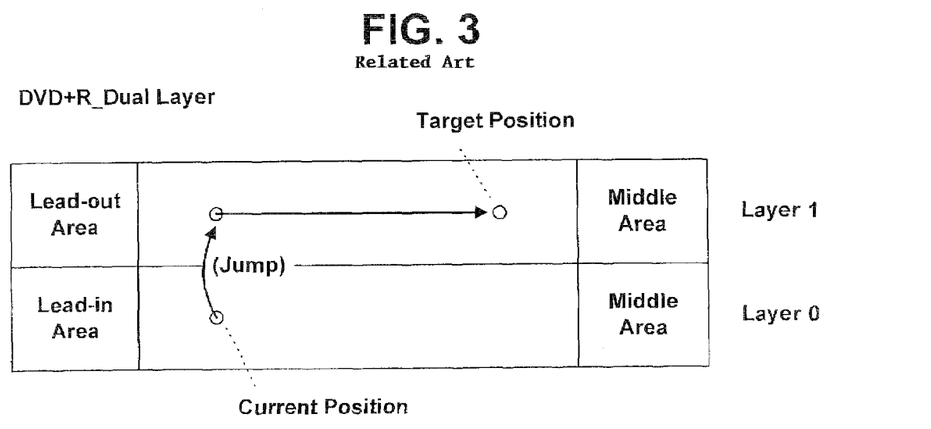
FIG. 3 and FIG. 4 illustrate processes for moving into target positions on a general multi-layer disc.
Figure 4:
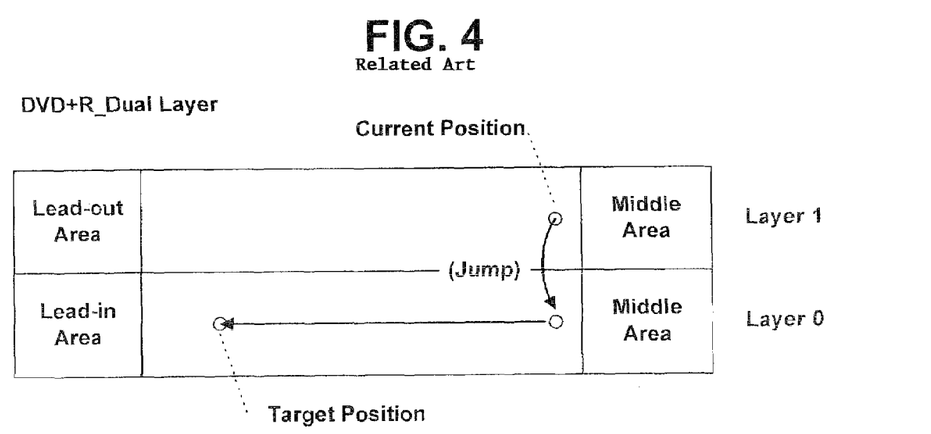

When the micro-computer 16 performs a seek operation to move the optical pick-up 11 from a current position of the first recording layer, Layer 0, to a target position of the second recording layer, Layer 1, it controls operations of the servo controller 15 such that the optical pick-up 11 performs a layer jump operation to access the second layer, Layer 1, and then horizontally moves to the target position. Similarly, as shown in FIG. 4, when the micro-computer 16 performs a seek operation to move the optical pick-up 11 from a current position of the second recording layer, Layer 1, which is close to the middle area, to a target position of the first recording layer, Layer 0, it controls operations of the servo controller 15 such that the optical pick-up 11 performs a layer jump operation to access the first layer, Layer 1, and then horizontally moves to the target position.

The middle areas, which are allocated to the first and second recording layers, Layers 0 and 1, respectively, are protection areas such that data is preferably not recorded in the outermost circumferential region of the disc 10. The middle areas preferably prevent the optical pick-up 11 from escaping the boundaries of the recording area while data are recorded in the first recording layer. The size and position of the middle area is predetermined in a multi-layered disc.

The disc may be finalized based on a single recording operation. However, if the disc is not finalized, a plurality of recording operations may be separately performed on the same disc. In this case, the recording area generated by each recording operation is referred to as a session. Therefore, in the former case, the disc has only one session, whereas in the latter case, the disc has multiple sessions.

Figure 5:
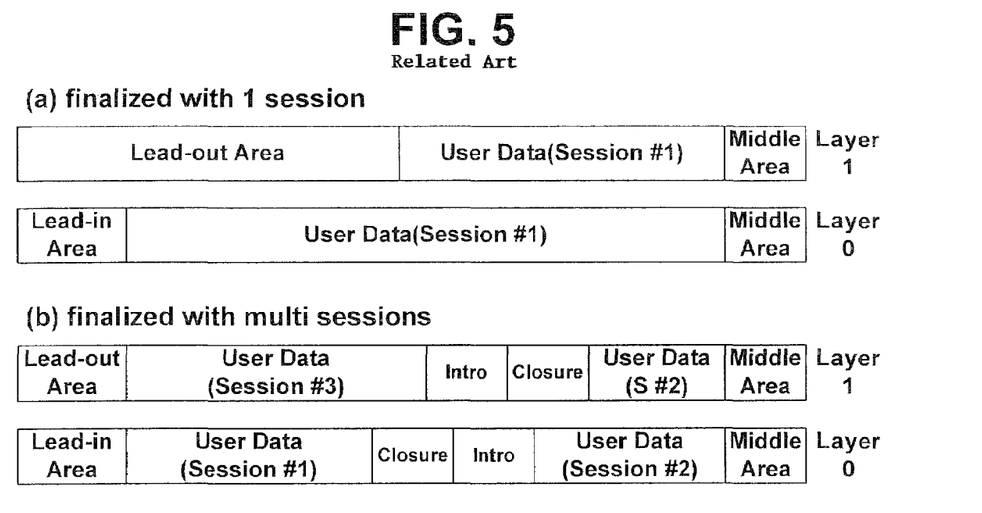
FIG. 5 illustrates a process for recording data on a multi-layer disc based on separated sessions.

As shown in FIG. 5, when data are recorded on a multi-layered disc with multi-sessions, the sessions are separated via an intro area allocated at the beginning of the session and a closure area allocated at the end of the session. An intro area is not allocated to the first session and a closure area is not allocated to the last session. The intro area and the closure area function to separate adjacent sessions, and no data is recorded therein. Therefore, when a desired session is accessed by a seek operation, a data area following an intro area of a corresponding session is directly accessed such that the data therein can be reproduced.

Figure 6:
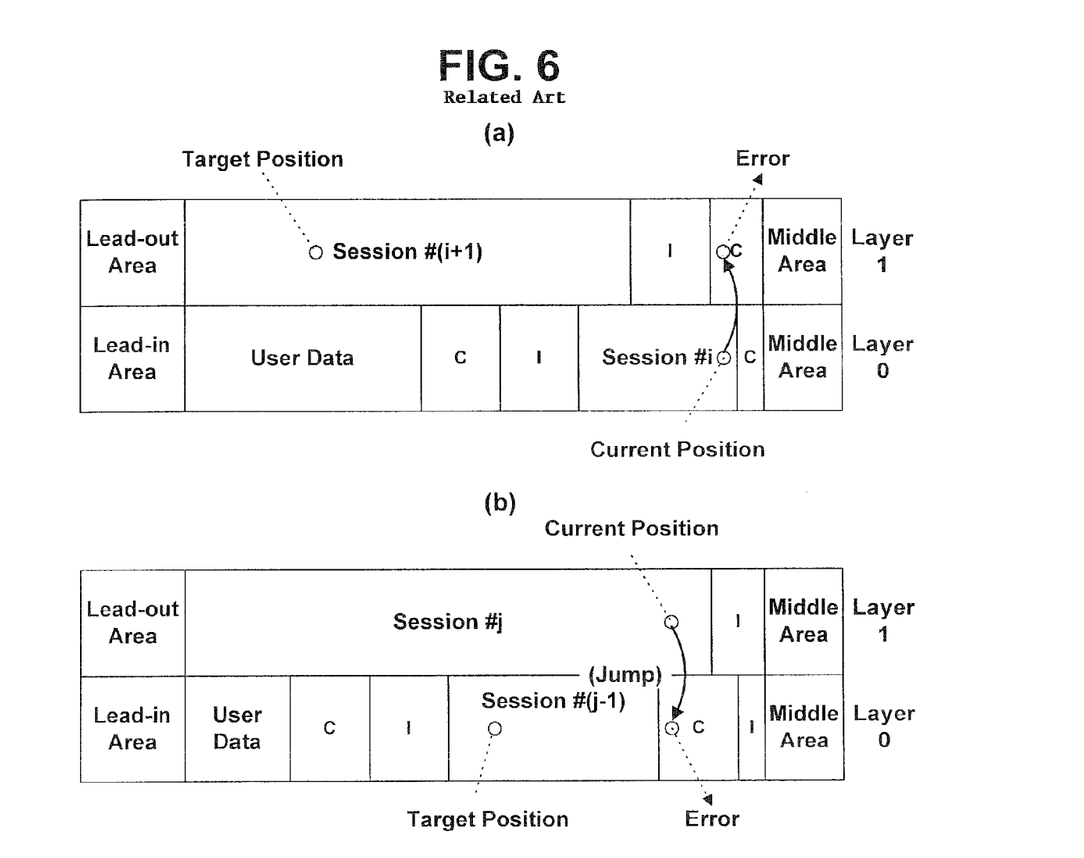
FIG. 6A and FIG. 6B illustrate processes for recording closure areas or intro areas of a session on both a first recording layer and a second recording layer of a multi-layer disc.

As shown in FIG. 6(*a*) and FIG. 6(*b*), when data are recorded on an optical recording disc with multi-sessions, two adjacent sessions may be recorded around the middle area such that portions of the closure area of the former session or the intro area of the latter session may be recorded in both the first recording layer and the second recording layer. An example of a layer jump operation under these circumstances is shown in FIG. 6(*a*) in which the optical pick-up 11 moves from a first, current position in the first layer to a second, target position in the second layer. In this example, the current position is located proximate a closure area of the i-th session, the i-th session being the last session of the first recording layer, and the closure area is recorded in both the first and second recording layers. The target position is located in the second recording layer and at a horizontal position which is inward relative to the current position. In this situation, upon performing the layer jump operation, the optical pick-up 11 accesses the closure area of the i-th session, which is adjacent to the middle area of the second recording layer 1, or the intro area of the (i+1)-th session, and the layer jump operation generally fails because the optical pick-up 11 encounters a non-data area upon completing the layer jump. Thus, due to the lack of location data in these non-data areas, the optical pick-up 11 cannot detect a corresponding recording position. Therefore, the target position cannot be reached, or seeking the target position is time consuming.

A similar situation is shown in FIG. 6(*b*). In this example, the current position is located proximate an intro area of the j-th session of the second recording layer with an intro area recorded in both the first and second recording layers, and the target position is located at the first recording layer, at a position which is horizontally inward from the current position. Upon performing the layer jump operation, the optical pick-up 11 accesses the closure area of the (j−1)-th session, which is adjacent to the middle area of the first recording layer, or the intro area of the j-th session, and again encounters a non-data area upon completion of the layer jump, and cannot access the target position.

Additionally, a typical optical recording disc has relatively low recording and reproducing qualities at its outer circumference due to eccentricity and surface vibration, which are greater at the outer circumference than at the inner circumference, and to non-uniform distribution of recording material at the outer circumference. Moreover, the optical recording disc has disadvantages in that servo operations, such as focusing, tracking, layer jumping, and the like cannot be accurately performed.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the invention is to provide a method for enabling an optical pick-up to precisely and rapidly move to a target position located at one of multiple layers of a multiple layer disc.

Another object of the invention is to provide a method for enabling an optical pick-up to perform layer jump operations preferably at an inner circumference of an optical disc when the optical disc device is moved into a target position located at another layer.

In accordance with the invention, the above and other objects can be accomplished by the provision of a method for seeking a target position on a multiple layer disc, including checking whether the horizontal movement direction from a current position to a first target position is from the inner circumference of the disc to the outer circumference or from the outer circumference of the disc to the inner circumference, when a layer jump operation is needed for seeking a first target position, and, according to the checked horizontal movement direction, determining priority sequence as to which one is firstly performed between the layer jump operation and the horizontal movement.

Preferably, the horizontal movement has highest priority at the current layer, when the horizontal movement direction is from the outer circumference of the disc to the inner circumference. Here, the layer jump operation for the layer in which the first target position is located has a priority sequence, when the direction of the horizontal movement for the first target position is from the inner circumference of the disc to the outer circumference. Also, a physical sector number of a second target position for the horizontal movement at the current layer corresponds to 2's complement of a physical sector number of the first target position.

Preferably, the multi-layer disc is a recordable dual layer DVD.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 7:
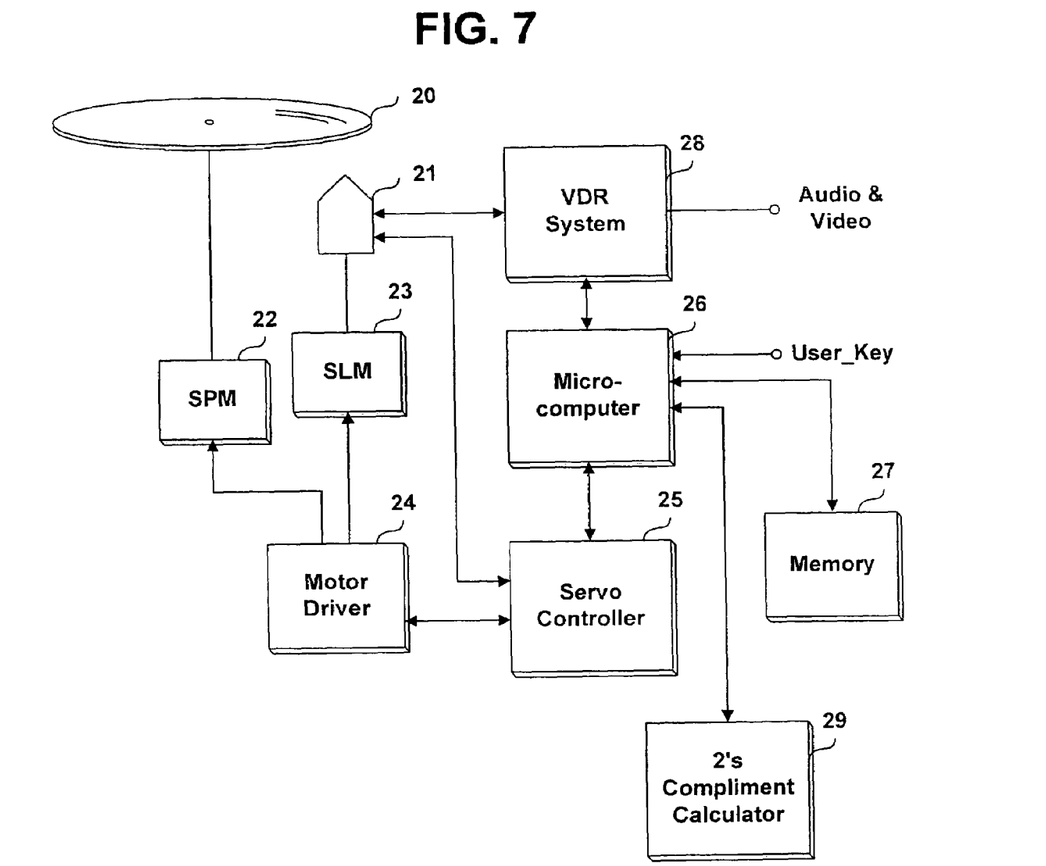
FIG. 7 is a schematic block diagram of a DVD recorder in accordance with an embodiment of the invention.

The invention may be applied to a variety of optical disc type devices, including, but not limited to, DVD recorders. For example, as shown in FIG. 7, a DVD recorder adopting the present invention may include an optical disc 20, an optical pick-up 21, a spindle motor 22, a sled motor 23, a motor drive 24, a servo controller 25, a microcomputer 26, a memory 27, a VDR system 28, and a 2's complement calculator 29. The 2's complement calculator 29 may be implemented in a number of different ways, including, for example, as software running in the microcomputer 26, or as a separate, standalone module of the DVD recorder.

The optical disc 20 may be, for example, a multi-layer disc with a DVD+R dual layer, including a first recording layer, Layer 0 and a second recording layer, Layer 1. The first recording layer, Layer 0 sequentially allocates a lead-in area, a data area and a middle area therein as it progresses from an inner circumference to an outer circumference of the disc 20. The second recording layer, Layer 1 allocates a middle area and a data area as it progresses from the outer circumference to the inner circumference of the disc 20. The data area can be recorded with a single session or multiple sessions. When the optical disc 20 is finalized, all the data after the last session are allocated to a read-out area.

Figure 8:
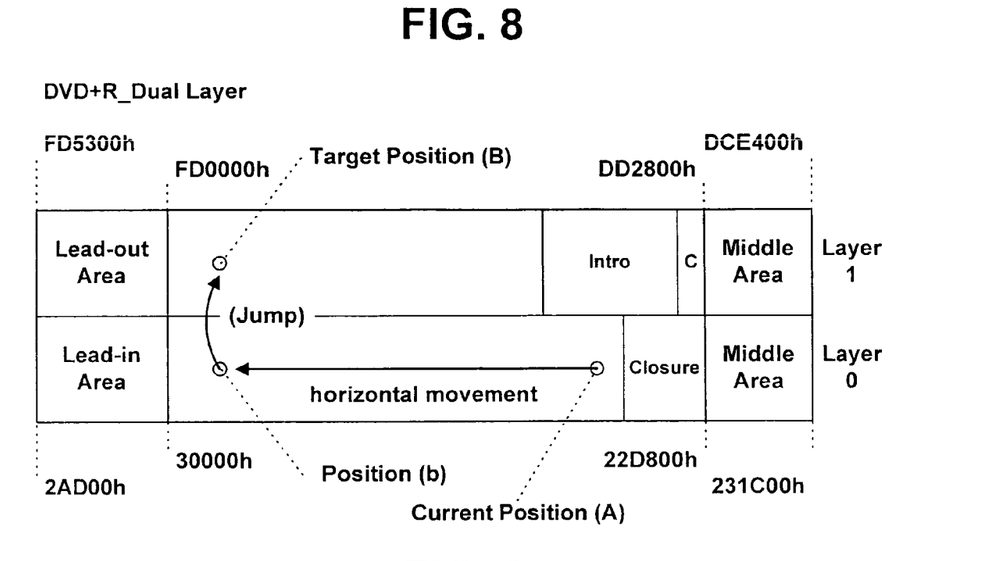
FIG. 8 and FIG. 9 illustrate processes for moving into target positions on a general multi-layer disc in accordance with an embodiment of the invention.
Figure 9:
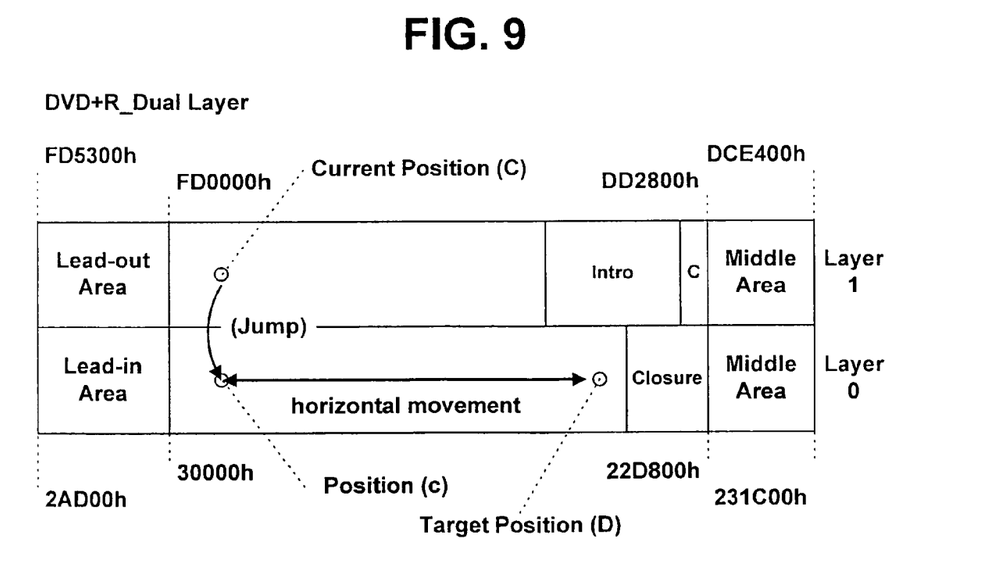

As shown in FIGS. 8 and 9, the middle area of the first recording layer, Layer 0 is allocated a physical sector number (PSN), in this example, 22D800 h~231C00 h. Since the middle area of the second recording layer, Layer 1 is allocated a physical sector number whose size is the same as that of the middle area of the first recording layer, Layer 0, the PSN of the second recording layer is DD2800 h DCE400 h and the PSNs between the data area of the first recording layer, Layer 0 and the data area of the second recording layer, Layer 1 are the 2's complement of one another.

In the discs shown in FIGS. 8 and 9, a closure area of the last session or an intro area of the first session is respectively recorded on both the first recording layer, Layer 0 and the second recording layer, Layer 1. Thus, the intro area and the closure area are allocated between two sessions to classify the two sessions, but no data is recorded in the intro and closure areas. Therefore, when the optical pick-up 21 performs a layer jump operation and accesses an intro area or a closure area, the seek operation is delayed due to the optical pick-up's position in a non-data area.

For example, when the target position of the second recording layer, Layer 1 is physical sector number (PSN) E80000 h, the 2's complement calculator 29 converts a hexa value, E80000 h, into a binary value, 1110 1000 0000 0000 0000, and then calculates the 2's complement, 0001 1000 0000 0000 0000 0000 (=0001 0111 1111 1111 1111 1111+1). After that, the 2's complement calculator 29 converts the 2's complement value to a hex value, 180000 h, thereby determining a specific position of the first recording layer, Layer 0 which corresponds to the target position of the second recording layer, Layer 1.

More particularly, the microcomputer 26 checks a current position and a target position when a seek operation is performed, and determines whether the optical pick-up must be moved from the outer circumference of the disc 20 to the inner circumference of the disc 20 (or not) in order for the optical pick-up to perform a layer jump operation and move from the current position to the target position.

If the optical pick-up moves from the outer circumference to the inner circumference of the disc 20, as shown in FIG. 8, the 2's complement calculator 29 determines a 2's complement position (for example, b) corresponding to the target position (for example, B) and then the optical pick-up 21 is moved horizontally within the first layer, Layer 0 from the current position (for example, A) in the first layer, Layer 0 to the 2's complement position (for example, b) in the first layer, Layer 0. After that, a layer jump operation is performed at the 2's complement position (for example, b) in the first layer, Layer 0 such that the optical pick-up 21 can be moved to the target position (for example, B) of the second recording layer, Layer 1. In this manner, the optical pick-up 21 is prevented from accessing the closure area of the last session in the first recording or the intro area of the first session in the second recording layer, or any other non-data area, due to the layer jump operation.

If, however, the optical pick-up moves from the inner circumference to the outer circumference of the disc 20 in order to access the target position, as shown in FIG. 9, the micro-computer 26 controls the operations of the servo controller 25 such that the optical pick-up 21 first performs a layer jump operation at the current position (for example, C) in the second layer to a corresponding position (for example, c) in the first layer. The optical pickup 21 then moves horizontally to the target position (for example, D) in the first recording layer. In this manner, the optical pick-up 21 is prevented from accessing the closure area or the intro area of a session, or any other non-data area, as it moves horizontally toward the outer circumference to the target position. Such operations of the optical pick-up 21 are described in detail below.

Figure 10:
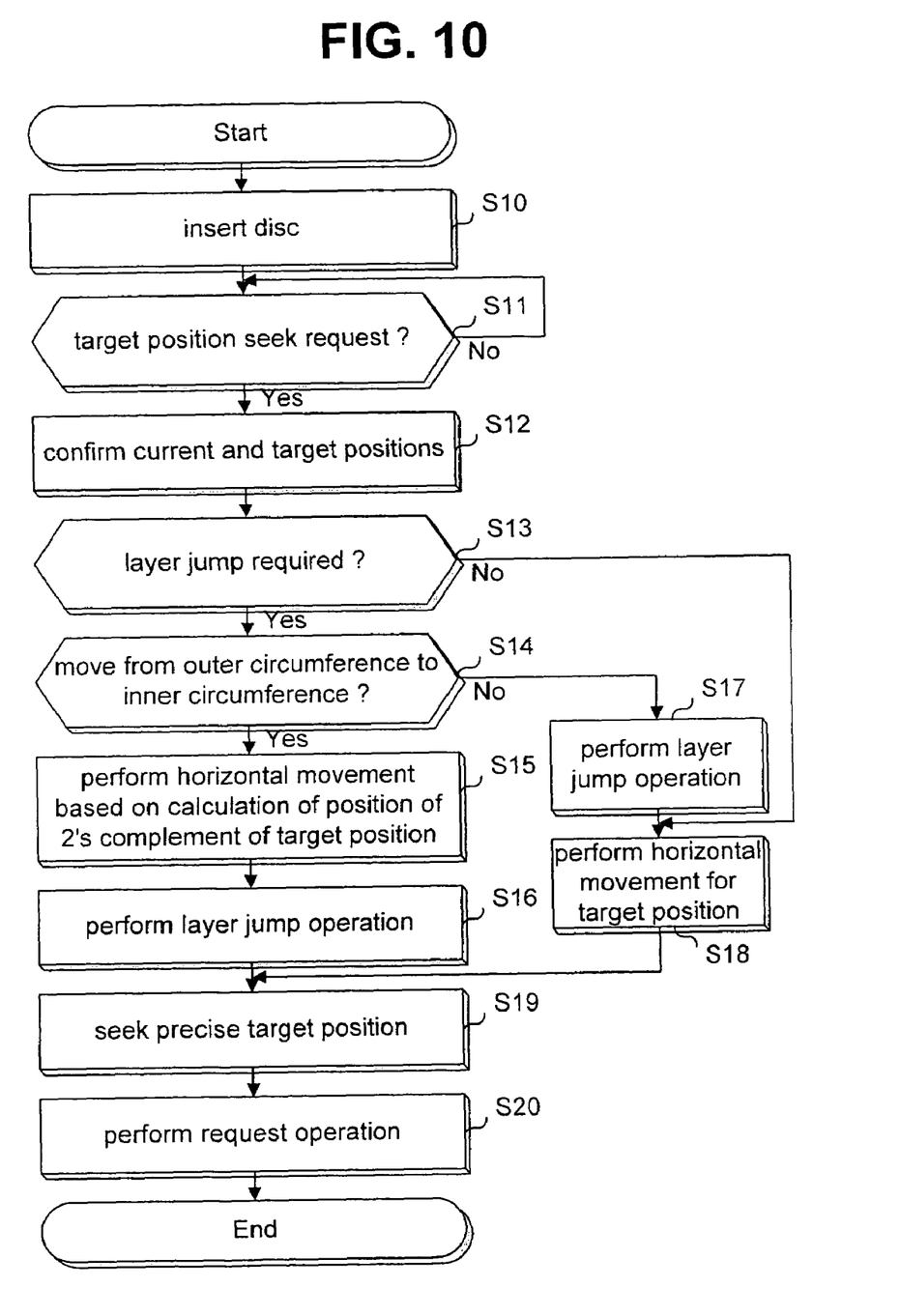
FIG. 10 is a flowchart describing a method for seeking a target position on a multi-layer disc presenting accordance with an embodiment of the invention.

FIG. 10 is a flowchart describing a method for seeking a target position on a multi-layer disc, in accordance with an embodiment of the invention.

When the optical disc 20 is inserted into the device in step S10, the microcomputer 26 reads out navigation information recorded in a read-in area of the optical disc and stores the information in the memory 27. Based on the navigation information, the microcomputer 26 determines whether the optical disc is a multi-layer disc, for example, a dual layer DVD+R, and then controls operations of the VDR system 28 such that a recording or a reproducing operation for requested data is performed.

When a seek operation is requested (step S11), the microcomputer 26 checks a current position and a target position (step S13) and, when a layer jump operation for movement toward the target position is needed (step S13), the microcomputer 26 determines whether the direction of movement from the current position to the target position is from the outer circumference of the disc to the inner circumference (step S14).

Based on this determination (step S14), as shown in FIG. 8, if the optical pick-up moves from the outer circumference to the inner circumference of the disc 20, the micro-computer 26 controls operations of the 2's complement calculator 29, which calculates a 2's complement position (for example, b) in the first layer which corresponds to the target position (for example, B) in the second layer. After that, the micro-computer 26 controls operations of the servo controller 25 to move the optical pick-up 21 horizontally from the current position (for example, A) in the first layer to the 2's complement position (for example, b) in the first layer (step S15), performs a layer jump operation from the 2's complement position (for example, b) in the first layer to a corresponding position in the second layer (step S16), and then searches for a precise target position (for example, B) (step S19).

Conversely, as shown in FIG. 9, if the optical pick-up moves from the inner circumference to the outer circumference, the micro-computer 26 controls operations of the servo controller 25 such that the optical pick-up 21 can directly perform a layer jump operation at the current position (for example, C) in the second layer to a corresponding position in the first layer (step S17), and then move horizontally from the corresponding position in the first layer (for example, c) toward the target position (for example, D) in the first recording layer, which is located proximate the outer circumference, (step S18), to search for a precise target position (for example, D) (step S19). After that, an operation for reproducing data or for recording new data is performed at the target position (step S20).

The invention can be adapted to various optical disc devices, including, but not limited to, DVD recorders, and also to various multi-layer discs, including, but not limited to, the dual layer DVD+R.

The method for seeking a target position on a multi-layer disc in accordance with embodiments of the invention performs a layer jump operation at the inner circumference of the optical disc when performing a seek operation for a target position. Because region proximate the inner circumference of the disc have superior recording and reproducing performance compared to regions proximate the outer circumference, a target position seek operation which requires a layer jump operation on a recording disc with multiple layers can be precisely and rapidly performed.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for moving between layers of a plurality of layers provided on a recordable medium, the recordable medium having an inner and an outer circumference, the method comprising:

determining a location of a target position relative to a current position, wherein the current position is located on a first layer of a plurality of layers of a recordable medium, and the target position is provided on a second layer of the plurality of layers, wherein the first and second layers are non-coplanar and wherein the first and the second layers each comprise multiple data sessions separated by intro and closure areas; and moving from the current position to the target position, wherein a transition from the first layer to the second layer always occurs proximate an inner circumference of the recordable medium, wherein always transitioning from the first layer to the second layer proximate an inner circumference of the recordable medium comprises transitioning from a data area in the first layer to a data area in the second layer, and wherein transitioning from the first to the second layer occurs in an area of the first and second layers other than the intro and closure areas.

2. The method as set forth in claim 1, further comprising performing a horizontal movement prior to transitioning from the first layer to the second layer if the current position is proximate an outer circumference of the recordable medium.

3. The method as set forth in claim 2, wherein performing a horizontal movement comprises moving horizontally from the current position proximate the outer circumference towards the inner circumference.

4. The method as set forth in claim 1, further comprising determining a 2's complement of the target position prior to moving from the current position to the target position if the current position is proximate an outer circumference of the recordable media.

5. The method as set forth in claim 4, wherein determining a 2's complement comprises:
   determining a physical sector number (PSN) which is a hexa value for the target position;
   converting the hexa value PSN for the target position into a corresponding binary value;
   calculating a 2's complement value for the corresponding binary value;
   determining a position in the first layer which corresponds to the target position based on the 2's complement.

6. The method as set forth in claim 5, further comprising a corresponding hex value prior to determining a position in the first layer which corresponds to the target position.

7. The method as set forth in claim 1, wherein always transitioning from the first layer to the second layer proximate an inner circumference of the recordable medium prevents eccentricity errors.

8. The method as set forth in claim 1, wherein always transitioning from the first layer to the second layer proximate an inner circumference of the recordable medium prevents transition into a non-data area provided on the second layer.

9. The method as set forth in claim 8, wherein the non-data area comprises an intro or a closure area provided on the second layer.

10. The method as set forth in claim 1, further comprising performing a horizontal movement after transitioning from the first layer to the second layer if the current position is proximate the inner circumference of the recordable media.

11. The method as set forth in claim 1, wherein the first layer comprises a Layer 0 and the second layer comprises a Layer 1 of a dual layer recordable medium.

12. The method as set forth in claim 11, wherein the Layer 0 comprises a lead-in area proximate the inner circumference and a middle area proximate the outer circumference, and the Layer 1 comprises a middle area proximate the outer circumference and a lead-out area proximate the inner circumference.

13. The method as set forth in claim 12, wherein the lead-in, lead-out, and middle areas each comprise non-data areas.

* * * * *